July 20, 1971  A. B. BROERMAN  3,594,261
NONWOVEN FABRIC AND METHOD OF MANUFACTURING SAME BY PERFORATING
A THERMOPLASTIC SHEET WITH A LASER BEAM
Filed Nov. 22, 1968
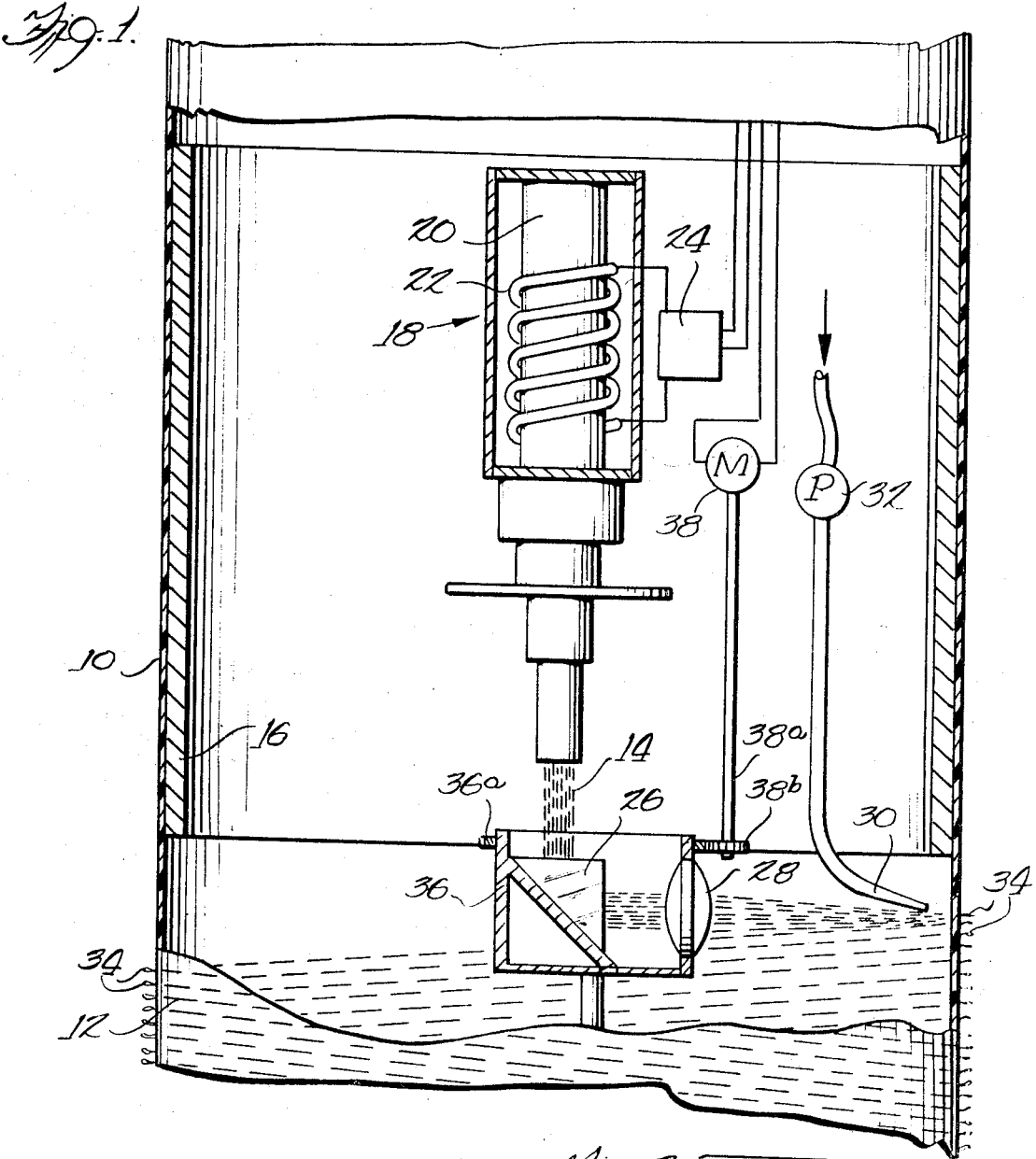
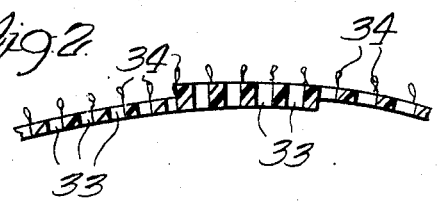
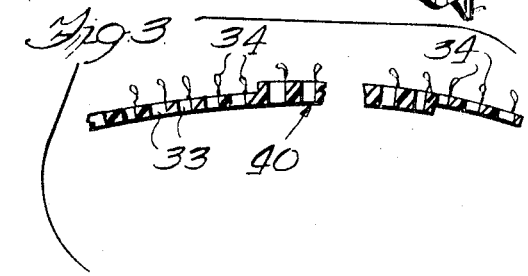
INVENTOR
Arthur B. Broerman
by Pendleton, Neuman,
Seibold & Williams
Attys 3,594,261
NONWOVEN FABRIC AND METHOD OF MANUFACTURING SAME BY PERFORATING A THERMOPLASTIC SHEET WITH A LASER BEAM
Arthur B. Broerman, Bartlesville, Okla., assignor to Phillips Petroleum Company
Filed Nov. 22, 1968, Ser. No. 778,190
Int. Cl. B23k 9/00; B29b 17/08; B32b 3/10
U.S. Cl. 161—62
12 Claims

ABSTRACT OF THE DISCLOSURE

A light absorbing thermoplastic sheet may be converted into a nonwoven textured fabric by directing a pulsed laser beam onto each area of a predetermined pattern of minute closely-spaced areas over the surface of the sheet with sufficient intensity to cause the sheet to melt and be perforated in each such area. While the area is molten, a stream of air or other gas may be directed into the area with sufficient force and duration to fibrillate or otherwise form the molten material therein.

BACKGROUND OF THE INVENTION

This invention relates to a nonwoven fabric which is produced by a novel method utilizing concentrated frequency-coherent radiant energy such as a laser beam. Not only is the process for making the fabric radically different from previous fabric-making processes, but the structure and appearance of the fabric itself are radially new and different. The process can be varied to obtain a variety of texture and decorative effects.

BRIEF DESCRIPTION OF THE INVENTION

In accordance with one embodiment of the invention the nonwoven textured fabric is formed of a thermoplastic sheet material and has a continuous unitary matrix with a multiplicity of perforations and a substantially equal number of fibrils. The fibrils are integral with the matrix and extend from adjacent the perforations at about 90° from the plane of the fabric. It is preferred that the diameter of the perforations be approximately equal to the spacing between the perforations and that neither of these be greater than the thickness of the sheet from which the fabric is formed.

One method for forming the fabric comprises directing a focused pulsing laser beam sequentially onto predeterminned areas over the surface of the thermoplastic sheet with sufficient intensity to cause the sheet to become molten in these areas. While each area is molten a stream of air or other gas is directed into the area with sufficient force and duration to force a fibril of desired length transversely from the sheet. It is preferred that the laser beam be of sufficient intensity to perforate the sheet, and if desired the sheet may be constructed by laminating a plurality of sheets having different physical properties or by first coating the sheet with a decorative coating. In one form of the process the sheet is formed in a tube with the pulsing laser beam being rotated about the interior of the tube and the tube being moved axially so that a helical pattern or network of perforations and fibrillations is formed.

BRIEF DESCRIPTION OF THE DRAWING

FIG. 1 is a schematic illustration of an apparatus which may be utilized to practice the process and produce the non-woven fabric of this invention;

FIG. 2 is an enlarged sectional view of a portion of the fabric formed by the process utilizing the apparatus illustrated in FIG. 1; and FIG. 3 is an enlarged sectional elevation of the portion of material illustrated in FIG. 2 after the material has been cut in the overlapping area to produce a selvage or thickened edge.

DESCRIPTION OF THE PREFERRED EMBODIMENTS

The present invention is adapted to transform a thermoplastic sheet material denoted by the numeral 10 in FIG. 1 directly into a textured nonwoven fabric denoted by the numeral 12. The sheet material 10 is a pliable thermoplastic material. It may be, for example, a polyolefin such as polypropylene or polyethylene. The material has light absorbing properties, i.e., it is not either completely transparent (e.g., such as glass) or completely reflective (e.g., such as a mirror). It has been found that sheet polypropylene of a thickness of approximately .020" may be treated by the process to produce a suitable nonwoven fabric.

The process comprises the steps of directing a pulsing laser beam 14 sequentially onto each area of a predetermined pattern of minute closely-spaced areas over the surface of the sheet 10, the laser beam 14 being of sufficient intensity and duration to cause the sheet to become molten in each of these areas. While each of the areas is molten a stream of air or other gas is directed into the area with sufficient force to suitably form the molten material in the area. The sheet 10 must absorb light in the wave length being emitted by the laser.

One form of apparatus which may be employed to carry out the process is illustrated in FIG. 1. In utilizing this apparatus the sheet material 10 is actually formed into a tube. This may be accomplished either by taking a sheet of plastic and overlapping its edges or by utilizing a tube which has been preformed either by joining the edges or by extruding into the tubular shape initially. In any event, the tubular sheet material 10 is pulled over a shroud 16 of generally cylindrical configuration.

Within the shroud is a laser head 18 which is preferably an optically pumped solid state laser such as one having a ruby rod 20, a helical flash lamp 22, and a suitable power supply 24, including a main or variable frequency high voltage supply and a trigger power supply. The ruby rod 20 and the power supply 24 are designed in such a way as to produce a rapidly pulsing laser beam 14 which when focused has sufficient intensity or power density to melt the thermoplastic sheet 10 in the area on which the beam is focused. In the illustrated embodiment the laser head 18 is oriented parallel to the axis of the shroud 16, and the laser beam 14 must be directed transversely against the sheet material 10 as it exits from the shroud. In order to accomplish this, a 90° totally reflecting prism 26 is employed with the laser beam coming from this prism being focused to a small spot by means of a lens 28.

The focused pulse laser beam is intended to melt an area of on the order of .005" in diameter upon the surface of the sheet 10. The area hit by the focused laser beam instantly becomes molten and a pulse or stream of air or other gas is directed against this area through a nozzle 30 operated by means of a control unit 32. This causes the molten spot of sheet material to be pneumatically formed. Preferably, the focused laser beam is of sufficient intensity and the blast of air is of sufficient strength and duration to form a perforation 33 and to blow a fibril 34 outwardly from adjacent the perforation in the sheet. This is best illustrated in FIGS. 2 and 3. The fibril 34 is blown transversely from and preferably at approximately 90° from the plane of the sheet 10, which in a tubular sheet 10 may be considered the plane of the tangent of the tube.

In order to produce a network or pattern of perforations 33 and fibrils 34, the prism 26 and lens 28 may be mounted on a rotating mount 36. The mount 36 may be rotated by means of a drive motor 38, an operating shaft 38a and pinion 38b. The pinion 38b may engage a gear 36a encircling the mounts 36. The desired speed of rotation of the mount 36 will depend upon the rate of the pulses from the laser 18 and the particular network or pattern of perforations and fibrils desired for the finished fabric.

In a typical application the laser beam may be pulsed 200 times per second with the pulse duration being on the order of 1 to 10 milliseconds. Air may be directed against the sheet by the nozzle 30 in synchronization with the laser pulses, or the air may be delivered continuously from the nozzle onto the areas or spots as they are being struck by the laser beam. The fibrils 34 will thus be blown out from each spot on the surface of the sheet which is hit by the laser beam. It is preferred that the speed of rotation of the mount 36 be such that for each pulse of the laser 18, the laser beam 14 will be moved approximately .010" at the periphery of the fabric. A laser pulsing at the rate of 200 pulses per second would thus move over the fabric at the rate of about 2 inches per second. While the mount 36 is rotating and the laser beam 14 is being pulsed, the tube 10 may be moved axially, resulting in the formation of a helical pattern of perforations 33 and fibrils 34. The time duration of the impingement of the focused laser beam on each spot or area is so short that the spot can be melted or perforated while the sheet is moving.

The perforations 33 in the helical pattern will be closely adjacent one another in rows giving the appearance of a mesh or net of openings and closed areas resembling a woven fabric, and the action of the laser in heating to form each hole or perforation 33 in effect forms an annealed area around the hole.

The fabric 12 has a continuous unitary matrix with a multiplicity of perforations 33 and a substantially equal number of fibrils 34. For best appearance the diameter of the perforations 33 should be no less than .003" and no greater than the thickness of the matrix or sheet 10 (e.g. .020" in the present example), and the diameter should not be substantially greater than the distance between perforations. It is preferred that the diameter of the perforations and the spacing therebetween be approximately the same, and in some instances, for proper appearance, the diameter of the perforations may be less than the distance between. The length of the fibril 34 may be controlled by the sustained heat of the molten spot (regulated, for example, by the energy output of the laser) and the rate of air delivery to the spot. The diameter of the perforations 33 may be controlled by the focusing of the lens 28.

A variety of differently appearing fabrics may be obtained by the process utilizing the same machine by merely adjusting energy levels, pulse rates and focusing so that the degree of melting and the hole sizes may be varied. The texture of the material will also depend upon the thickness and type of plastic material being processed. With material such as laminated or vacuum metallized plastics, many different appearances and textures for the material may be achieved. It is also possible to provide a multi-orifice blower or to otherwise split the air stream from the nozzle 30 so that several fibrils 34 may be formed for each spot which is melted by the laser beam.

The apparatus illustrated in FIG. 1 is adapted to produce a tubular fabric, but it will be appreciated that the invention may be employed in the production of either a flat or a tubular fabric. If the tube is formed by overlapping the edges of the initial sheet 10, the edge joints will resemble the structure shown in FIG. 2. It will be noted that the edge joint has been perforated and fibrils 34 blown therefrom just as in the rest of the sheet, and this causes these edges to be welded together. The tubular fabric may then be cut in the area of the overlap, leaving a selvage edge 40 on the flat material as shown in FIG. 3.

As an alternative to rotating the focused laser beam within the interior of a tubular sheet of material 10, it would be possible to focus the laser beam directly onto a flat sheet of material and then to move the laser and the beam, indexing it over the surface of the material to form the mesh or net of openings and closed areas. The laser could be mounted within or otherwise focused through a pneumatic tube, thereby assuring that the fibrils 34 would be blown at about 90° from the plane of the sheet 10 (or from the tangent in the case of a tubular sheet). It would also be possible to utilize a number of lasers with a multi-orifice nozzle, forming a number of lines of fibrillated plastic as the sheet is moved in front of the laser beams.

By programming the energy levels, feed rates, material thicknesses and blowing pressures, the finished fabric may be varied in appearance from a tricotlike material to a carpetlike material.

It is to be understood that the present disclosure has been made only by way of example and that many additional modifications, changes, and various details may be resorted to without departing from the spirit and scope of the invention as hereinafter claimed.

What is claimed is:

1. A method of forming a decorative fabric from a sheet of light absorbing pliable thermoplastic material which comprises directing pulsing laser beam sequentially onto predetermined, minute, closely-spaced areas over the surface of the sheet with sufficient intensity to cause the sheet to become molten in each area, and forming the material in each area while molten, by directing a blast of fluid against the molten material whereby the molten material is forced from the sheet and forms fibrils.

2. The process of claim 1 wherein the laser beam is of sufficient intensity to perforate the sheet.

3. The process of claim 1 wherein the sheet is a laminate.

4. The process of claim 1 wherein the sheet is first coated with a metallic decorative coating.

5. The process of claim 1 wherein the irradiated molten areas are formed by directing a pulse of air against the area with sufficient force and of sufficient duration to force a fibril of desired length from the sheet at approximately 90° from the sheet.

6. The process of claim 1 wherein the sheet is first formed into a tube and the laser beam is directed onto the predetermined areas by focusing it against the interior surface of the tube in a direction transverse to the axis of the tube, and wherein the beam is rotated substantially about the axis of the tube while moving the tube along its axis transverse to the laser beam.

7. The process of claim 6 wherein the sheet is initially formed into a tube by overlapping the sides; and following the step of forming, the tubular sheet is cut along the overlapping area to form at least one selvage edge.

8. A fabric formed of light absorbing pliable thermoplastic material having a continuous unitary matrix with a multiplicity of perforations and a substantially equal number of fibrils integral with the matrix and extending from adjacent the perforations at about 90° from the plane of the fabric.

9. The fabric of claim 8 wherein the diameter of the perforations and the spacing between are approximately the same.

10. The fabric of claim 9 wherein the diameter perforations and the spacing between are each approximately between about .003" and about .020".

11. The fabric of claim 8 wherein the diameter of the perforations is no greater than the thickness of the sheet.

12. The process of claim 11 wherein the fluid stream is gaseous.

References Cited

UNITED STATES PATENTS

| 3,113,349 | 12/1963 | Nottebohm et al. | 156—252UX |
| 3,265,855 | 8/1966 | Norton | 331—94.5 |
| 3,410,979 | 11/1968 | Larsson | 331—94.5 |

OTHER REFERENCES

Elion, H. A., Laser Systems and Applications, Pergamon Press, New York (1967).

JOHN T. GOOLKASIAN, Primary Examiner

W. E. HOAG, Assistant Examiner

U.S. Cl. X.R.

156—252, 253, 272; 161—110, 112, 164, 247; 219—121, 384; 264—25, 154

UNITED STATES PATENT OFFICE
CERTIFICATE OF CORRECTION

Patent No. 3,594,261      Dated July 20, 1971

Inventor(s)   A. B. Broerman

It is certified that error appears in the above-identified patent and that said Letters Patent are hereby corrected as shown below:

Column 1, line 31, "radially" should be --radically--

Column 1, line 33, "texture" should be --textures--

Column 3, line 28, "mounts" should be --mount--

Column 5, line 17, in Claim 12, "11" should be --1--

Signed and sealed this 22nd day of February 1972.

(SEAL)
Attest:

EDWARD M. FLETCHER, JR.
Attesting Officer

ROBERT GOTTSCHALK
Commissioner of Patents

Dedication

3,594,261.—*Arthur B. Broerman*, Bartlesville, Okla. NON-WOVEN FABRIC AND METHOD OF MANUFACTURING SAME BY PERFORATING A THERMOPLASTIC SHEET WITH A LASER BEAM. Patent dated July 20, 1971. Dedication filed Dec. 28, 1971, by the assignee, *Phillips Petroleum Company*.

Hereby dedicates the remaining term of the patent to the Public.

[*Official Gazette November 14, 1972.*]